United States Patent [19]

Chung et al.

[11] Patent Number: 5,429,749
[45] Date of Patent: Jul. 4, 1995

[54] POLYMERS FOR TREATMENT OF FOOD PROCESSING WASTES

[75] Inventors: Daniel K. Chung, Burlington, Canada; Manian Ramesh, Naperville; Chandrashekar S. Shetty, Lisle, both of Ill.

[73] Assignee: Nalco Chemical Company, Naperville, Ill.

[21] Appl. No.: 252,011

[22] Filed: Jun. 1, 1994

[51] Int. Cl.⁶ .................................................. C02F 1/56
[52] U.S. Cl. ..................... 210/734; 210/727; 210/735
[58] Field of Search ............... 210/727, 728, 734, 735, 210/736

[56] References Cited

U.S. PATENT DOCUMENTS

| | | | |
|---|---|---|---|
| 3,409,547 | 11/1968 | Dajani | 210/735 |
| 3,461,163 | 8/1969 | Boothe | 210/735 |
| 4,151,202 | 4/1979 | Hunter et al. | |
| 4,330,450 | 5/1982 | Lipowski et al. | 210/734 |
| 4,396,513 | 8/1983 | Haldeman | 210/734 |
| 4,734,205 | 3/1988 | Jaques et al. | 210/734 |
| 4,741,835 | 5/1988 | Jaques et al. | 210/734 |
| 4,790,943 | 12/1988 | Dunn et al. | 210/727 |
| 4,835,234 | 5/1989 | Valint et al. | 210/734 |
| 4,869,829 | 9/1989 | Casey | 210/734 |
| 5,116,514 | 5/1992 | Huang et al. | 210/712 |
| 5,283,306 | 2/1994 | Ramesh et al. | 526/312 |

Primary Examiner—Peter A. Hruskoci
Assistant Examiner—Theodore M. Green
Attorney, Agent, or Firm—Robert A. Miller; James J. Drake

[57] ABSTRACT

A method for conditioning food processing waste prior to chemical dewatering comprising the step of treating the food processing waste with an effective amount of at least one hydrophobic polymer coagulant.

7 Claims, 3 Drawing Sheets

POLYMERS FOR TREATMENT OF FOOD PROCESSING WASTES

BACKGROUND OF THE INVENTION

1. Field of the Invention

The present invention relates generally to the treatment of food processing wastes. More particularly, the present invention provides a chemical treatment method that effectively removes fat, blood, tissue and other solids from food processing waste.

2. Description of the Prior Art

Everyday the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is to be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the waste back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

One of the most effective methods of removing fat, blood, tissue and other solids in waste waters is through the use of chemical aids. Historically, dry polymers and inverse emulsion latexes have been used to treat food processing water. Each material has its own advantages and disadvantages. While dry polymers have the benefit of being extremely concentrated, thereby reducing shipping costs, the equipment to dissolve the polymers is expensive and is not available to all end-users on site. Dry polymers also have a large extent of cross-linking; thus, insoluble, gel materials are present.

Latex polymers also suffer from problems but are used quite frequently. Latex polymer preparations include 30–35% solids dispersed in oil. The latex polymer must also be inverted prior to use. Numerous problems associated with this feeding method have caused many customers to avoid latex polymers. In addition, the latexes generally have a very narrow treating range, often resulting in over-treatment at higher dosages.

Chemicals such as polyethylene oxide, polyethylene amine, polydiallyldimethylammonium chloride and copolymers of acrylamide and quaternized acrylates are specific types of chemical treatments that have been used in the food processing industry. While these chemical treatments have provided a means for removing food, blood, oil and other solids from the waste water, disadvantages exist with the use of such chemical treatments. For example, the above polymers have been traditionally synthesized in an oil solvent, thereby producing an environmentally unfriendly treatment program as well as presenting a potential fire hazard. In addition, chemical treatments incorporating the above polymers contain surfactants. Still further, these prior chemical treatments have a high toxicity thereby preventing the use of such treated waters for recycling purposes or for public drinking water supplies.

Therefore, a need exists for a treatment system that addresses all the environmental concerns presented by food processing waste, while at the same time being environmentally friendly.

SUMMARY OF THE INVENTION

The invention provides a method for conditioning food processing waste prior to chemical dewatering. According to the method, food processing waste is treated with an effective amount of at least one hydrophobic polymer coagulant, preferably followed by a flocculant. The hydrophobic coagulant is preferably selected from the group consisting of hydrophobically modified diallyldimethylammonium chloride (DADMAC) copolymers and hydrophobically modified acrylamide (AcAm) copolymers.

The hydrophobically modified copolymer of acrylamide is preferably a copolymer including both acrylamide monomers and mineral or organic acid salts of dimethylaminoethylmethacrylate monomers (DMAEM). The hydrophobically modified diallyldimethylammonium chloride copolymer is one copolymer selected from the group consisting of diallyldimethylammonium chloride/dimethylaminoethylacrylate benzyl chloride quaternary, diallyldimethylammonium chloride/dimethylaminoethylacrylate cetyl chloride quaternary, diallyldimethylammonium chloride/dimethylaminoethylmethacrylate benzyl chloride quaternary, and diallyldimethylammonium chloride/dimethylaminoethylmethacrylate cetyl chloride quaternary and diallyldimethylammonium chloride/ethylhexyl acrylate copolymer.

An advantage of the present invention is that it utilizes hydrophobically modified polymers that contain no oil or hazardous ingredients and therefore do not contribute adversely to the impact of the food waste on the environment. Instead, the hydrophobically modified polymers of the present invention are synthesized entirely in water, eliminating the need for special activators.

Still further, an advantage of the present invention is that it not only conditions the food processing sludge prior to mechanical dewatering, it also clarifies the food processing waste.

Yet another advantage of the present invention is that it provides a complete treatment system that meets all the environmental concerns presented by food processing wastes.

Additional features and advantages of the present invention are described in, and will be apparent from, the detailed description of the presently preferred embodiments and the Figures.

DESCRIPTION OF THE PREFERRED EMBODIMENTS

Figure 1:
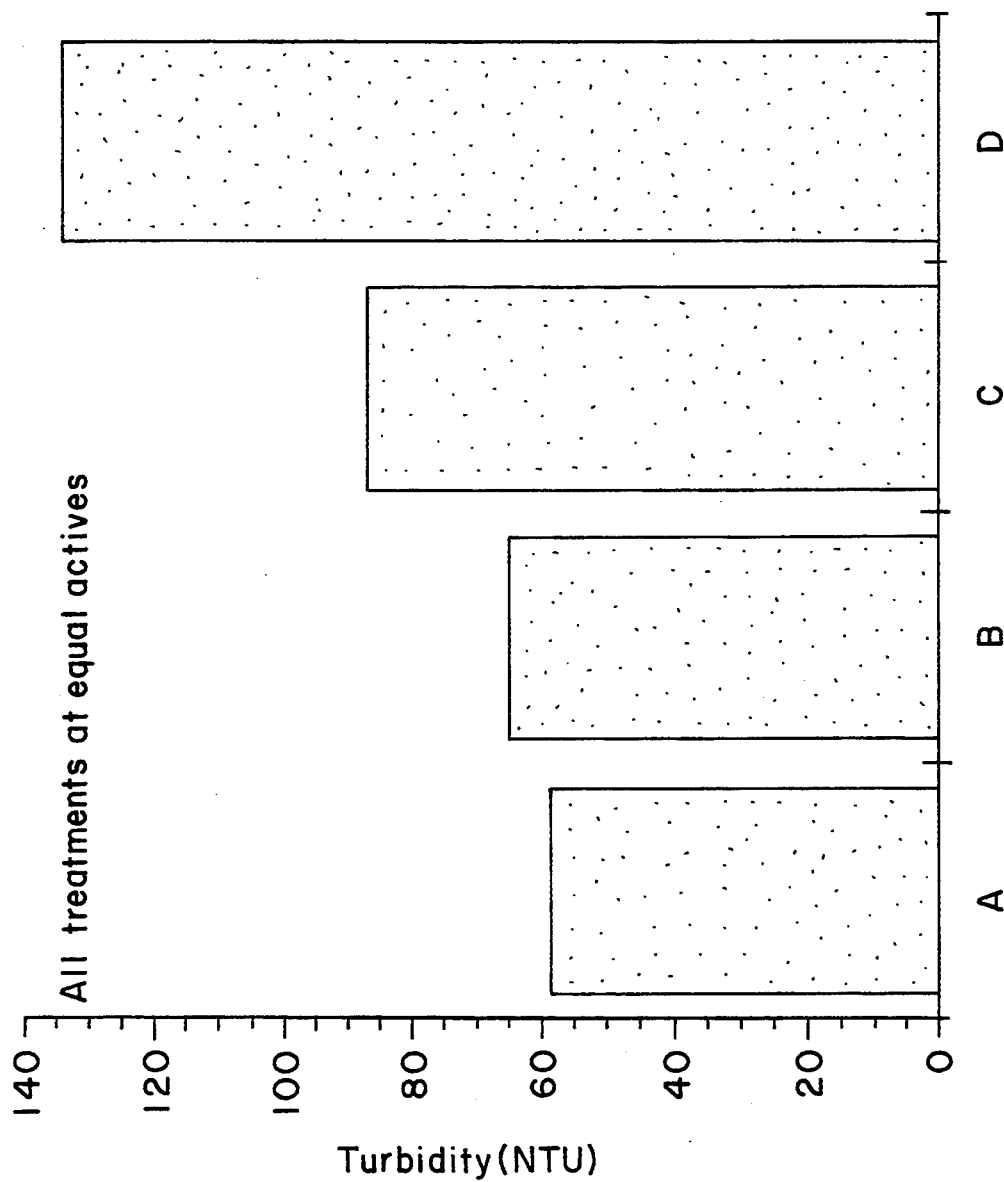
FIG. 1 is a bar graph comparing hydrophobic DADMAC copolymers versus a commercially available program.

The present invention provides a method for conditioning food processing waste. The method includes the step of adding a hydrophobically modified polymer coagulant followed by a flocculant to the food processing waste. The invention provides a superior method for removing fat, blood, tissue, and the like from food processing waste. The hydrophobically modified polymers of the present invention have been discovered to be more effective in removing such products from food processing waste than currently available chemical treatments.

According to one embodiment of the invention, the hydrophobic copolymers of the invention are copolymers including diallyldimethylammonium chloride (DADMAC) monomer and a hydrophobic monomero Preferably, the hydrophobic monomer is preferably selected from an appropriately quaternized dimethylaminoethylacrylate (DMAEA) or dimethylaminoethylmethacrylate (DMAEM).

The quaternized DMAEA and DMAEM monomers may include C$_4$ to C$_{20}$ chloride which may be either aliphatic (e.g., cetyl chloride quaternary (CCQ)) or aromatic (e.g., benzyl chloride quaternary (BCQ)). Cationic monomers may also include sulfate, bromide or other similar quaternaries.

It has been discovered that the performance of poly(DADMAC) can be significantly improved by incorporating a certain degree of hydrophobic nature. Such a hydrophobic modification can be accomplished by copolymerizing DADMAC with hydrophobic monomers, such as, DMAEA•BCQ, DMAEM•BCQ, DMAEA•CCQ, DMAEM•CCQ, DMAEA•MCQ, DMAEM•MCQ, and alkyl acrylates, preferably ethylhexyl acrylate.

The hydrophobic polyelectrolyte copolymer preferably comprises a diallyldimethylammonium chloride and a hydrophobic monomer. Preferably, the hydrophobic monomer is one monomer selected from the group consisting of: quaternized dimethylaminoethyl acrylates and quaternized dimethylaminoethylmethacrylates. DMAEA and DMAEM are preferably quaternized using C$_4$ to C$_{20}$ chloride quaternaries or methyl chloride quaternaries. The preferred C$_4$ to C$_{20}$ aromatic and aliphatic chloride quaternaries are benzyl chloride quaternary and cetyl chloride quaternary, respectively. The preferred quaternary ester is an ester of acrylic acid or methacrylic acid, such as ethylhexyl acrylate. Other preferred hydrophobic monomers of the invention include vinylpyrolidone, styrene, vinylformamide, vinylacetamide, vinylpyridine, and vinylmaleimide.

The DADMAC can be prepared in accordance with any conventional manner such as the technique described in U.S. Pat. No. 4,151,202 (Hunter et al.), which issued on Apr. 24, 1979, and which is incorporated herein by reference.

The quaternized dimethylaminoethylacrylate is selected from the group consisting of: dimethylaminoethylacrylates having C$_4$ to C$_{20}$ chloride quaternary. The dimethylaminoethylacrylates having C$_4$ to C$_{20}$ chloride quaternary are preferably either dimethylaminoethylacrylate benzyl chloride quaternary or dimethylaminoethylacrylate cetyl chloride quaternary.

The quaternized dimethylaminoethylmethacrylate is selected from the group consisting of: dimethylaminoethylmethacrylates having C$_4$ to C$_{20}$ chloride quaternary. The dimethylaminoethylmethacrylates having C$_4$ to C$_{20}$ chloride quaternary are preferably either dimethylaminoethylmethacrylate benzyl chloride quaternary or dimethylaminoethylmethacrylate cetyl chloride quaternary.

The diallyldimethylammonium chloride and the hydrophobic monomer are preferably present in a molar ratio in the range from 99:1 to 20:80. The hydrophobic DADMAC copolymers of the invention are described in detail in U.S. Pat. No. 5,283,306, the disclosure of which is herein incorporated by reference.

By way of example, suitable hydrophobically modified polymer coagulants that may be used in the present invention include hydrophobic coagulants selected from the group consisting of a hydrophobically modified copolymer of diallyldimethylammonium chloride and a hydrophobically modified copolymer of acrylamide. More preferably, the hydrophobically modified dialiyldimethylammonium chloride polymer is one copolymer selected from the group consisting of diallyldimethylammonium chloride/dimethylaminoethylacrylate benzyl chloride quaternary, diallyldimethylammonium chloride/dimethylaminoethylacrylate cetyl chloride quaternary, diallyldimethylammonium chloride/dimethylaminoethylmethacrylate benzyl chloride quaternary, and diallyldimethylammonium chloride/dimethylaminoethylmethacrylate cetyl chloride quaternary.

According to another embodiment of the invention, the hydrophobically modified copolymer of acrylamide is a copolymer of acrylamide and dimethylaminoethylmethacrylate sulfuric acid salt (DMAEM•H$_2$SO$_4$). More preferably, the copolymer of DMAEM•H$_2$SO$_4$ and acrylamide ("AcAm") includes from about 15 to about 50 mole percent of DMAEM•H$_2$SO$_4$ and from about 50 to 85 mole percent of AcAm. DMAEM salts of other mineral acids such as DMAEM•hydrochloride, DMAEM• phosphate, and DMAEM•nitrate, as well as organic acid salts, such as DMAEM•acetate, DMAEM•oxalate, DMAEM•citrate, DMAEM•benzoate and DMAEM•succinate can also be used. In an even more preferred embodiment, the polymer composition is comprised of from about 20 to about 30 mole percent DMAEM•H$_2$SO$_4$ and from about 70 to about 80 mole percent of AcAm. The hydrophobically modified AcAm polymers of the invention are described in detail in U.S. Pat. No. 5,116,514, the disclosure of which is incorporated herein by reference.

The flocculant which may be used in this program may be anionic, non-ionic or cationic. Anionic flocculants are exemplified by AcAm/sodium or ammonium (meth)acrylate copolymers, poly (sodium or ammonium (meth)acrylate), AcAm/sodium AMPS copolymers, homo or copolymers of vinylsulfonic acid, homo or copolymers of maleic acid. Nonionic flocculants include, poly(meth)acrylamide, polyethylene oxide, clays and bentonite. Cationic flocculants include homo or copolymers of DMAEA or DMAEM quats with AcAm.

In an embodiment, the method of the present invention includes the further step of adding an effective amount of a precipitant to the food processing waste. The precipitant component of the present invention facilitates the removal of unwanted chemicals within the final effluent. Naturally, the particular type of precipitant chosen depends on the particular constituent that is to be removed from the food processing waste.

Pursuant to the method of the present invention, food processing waste can be purified and an environmentally friendly water is simultaneously obtained. In an embodiment, the method of the present invention involves the addition of at least one hydrophobically modified polymer flocculant to the food processing waste. While the sole addition of the hydrophobically modified polymer flocculant effectively conditions the food processing waste prior to mechanical dewatering, the combined addition of a coagulant and precipitant provides a complete chemical treatment method.

The optimal amounts of the various components required for effectiveness in this invention depend on the type of food processing waste being treated. In addition, the concentration of the combined components varies greatly and can depend upon the conditions such as temperature and pH of the food processing waste.

According to the method, the polymers of the present invention are added to a food processing waste water stream. In an embodiment, the polymers are added in an effective amount of from 1 to 500 ppm. In a more preferred embodiment, the polymers are added in an effective amount of from 5 to 200 ppm. In the most preferred embodiment, the polymers are added in an amount of from 20 to 100 ppm.

The hydrophobically modified coagulants of the present invention can be applied to food processing waste slurry, stored or screened solids, or to filtrate produced by dewatering. In an embodiment, the coagulant, followed by a flocculant, is directly injected into the food processing waste. The coagulant may be added with or without a dilution system. The polymers of the invention are preferably added to the system in neat form. However, in some applications, the polymers can be added as an aqueous solution. The active polymer bridges suspended solids leading to optimal dewatering of solids as well as optimal clarification of filtrate liquors.

Once the polymers of the invention are added to the waste water stream, the treated water is naturally agitated as it moves through the process stream of the food processing plant. The polymers of the invention will cause the fat, blood, tissue and the like to separate from the water and float to the surface of the water as a floc. The floc is subsequently removed from the surface of the water and handled further. The treated water can now be discharged either into a river, lake or recycled into an industrial process.

For a complete chemical treatment system, a second coagulant and a precipitant may also be added to the food processing waste water. In an embodiment, the second coagulant component of the present invention is added in an effective amount of from 0.01 to 2 ppm. Whereas, in an embodiment, the precipitant component of the present invention is added in an effective amount of from 5 to 100 ppm. The second coagulant portion of the present invention is preferably applied to the filtrate produced by dewatering of the food processing waste slurry, or to food processing waste. The precipitant portion of the present invention is preferably applied neat direct to the filtrate or food processing waste. The precipitants not only facilitate the removal of unwanted chemicals but also allow optimal coagulation and settlement of solids.

Examples of suitable second coagulants that may be used in the present invention include: ferric sulfate, ferrous sulfate, aluminum sulfate, aluminum chloride, polyaluminum chloride, ferrous chloride, ferric chloride, aluminum chlorohydrate, ethylene-dichloride/ammonia polymers, melamine/formaldehyde polymers, and epichlorohydrindimethylamine condensation polymer in liquid form; polydiallyldimethyl ammonium chloride in liquid or solid form; and mixtures thereof.

The following examples are presented to describe preferred embodiments and utilities of the invention and are not meant to limit the invention unless otherwise stated in the claims appended hereto.

Example 1

The hydrophobically modified DADMAC copolymers of the invention were dissolved in water. This solution was stirred for 30 minutes. A 1% solution of a flocculant (AcAm/sodium acrylamide copolymer) was prepared.

In a 800 ml beaker, 500 ml of food processing waste water from a chicken processing plant was treated with hydrophobic coagulant (5–500 ppm, as needed) and mixed for 60 seconds. The flocculant was then added and the mixing continued for another 60 seconds. Agitation was then stopped and the solution was allowed to stand for 60 seconds. The supernatant liquid was separated and its turbidity measured using a HACH® DR2000 turbidimeter.

Figure 2:
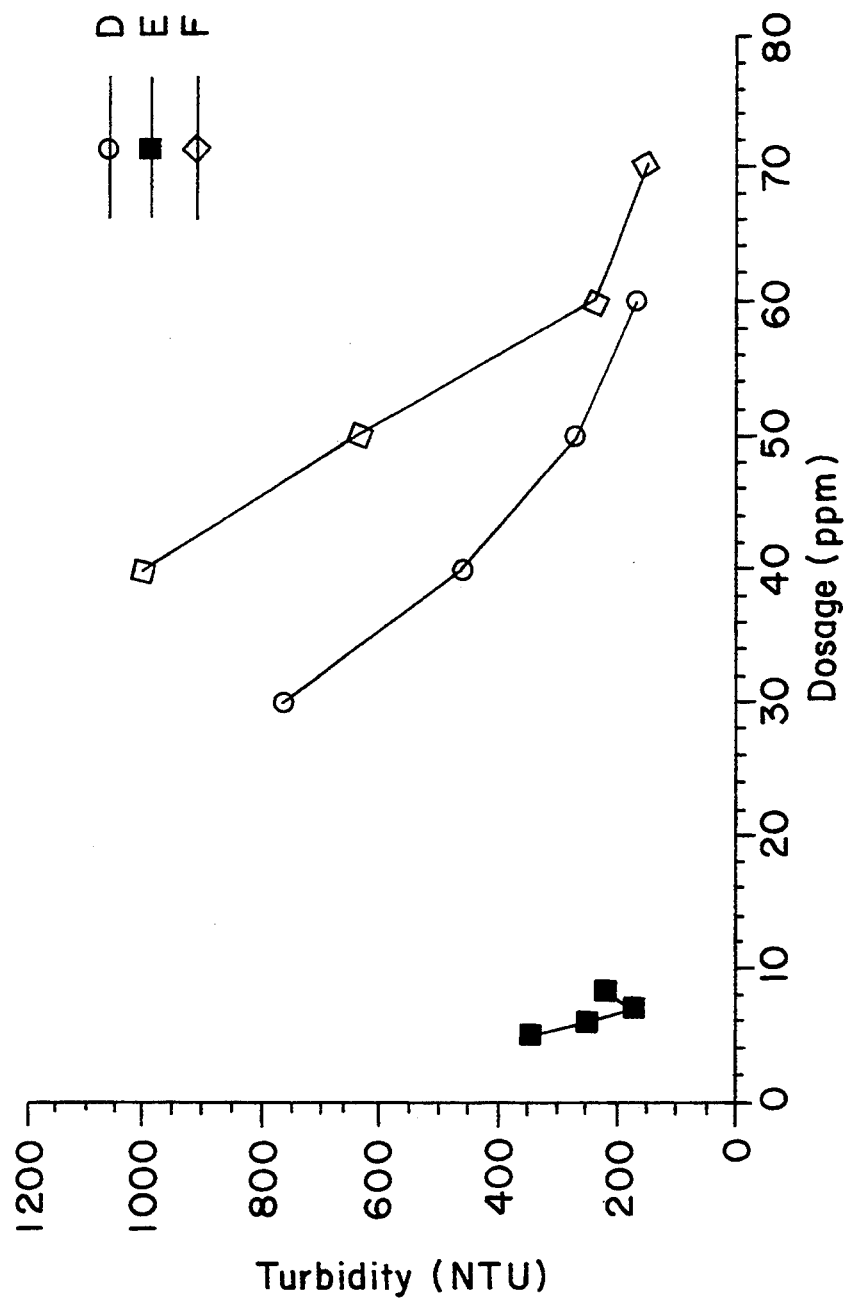
FIG. 2 graphically compares AcAm/DMAEM•H$_2$SO$_4$ versus commercial treatment.
Figure 3:
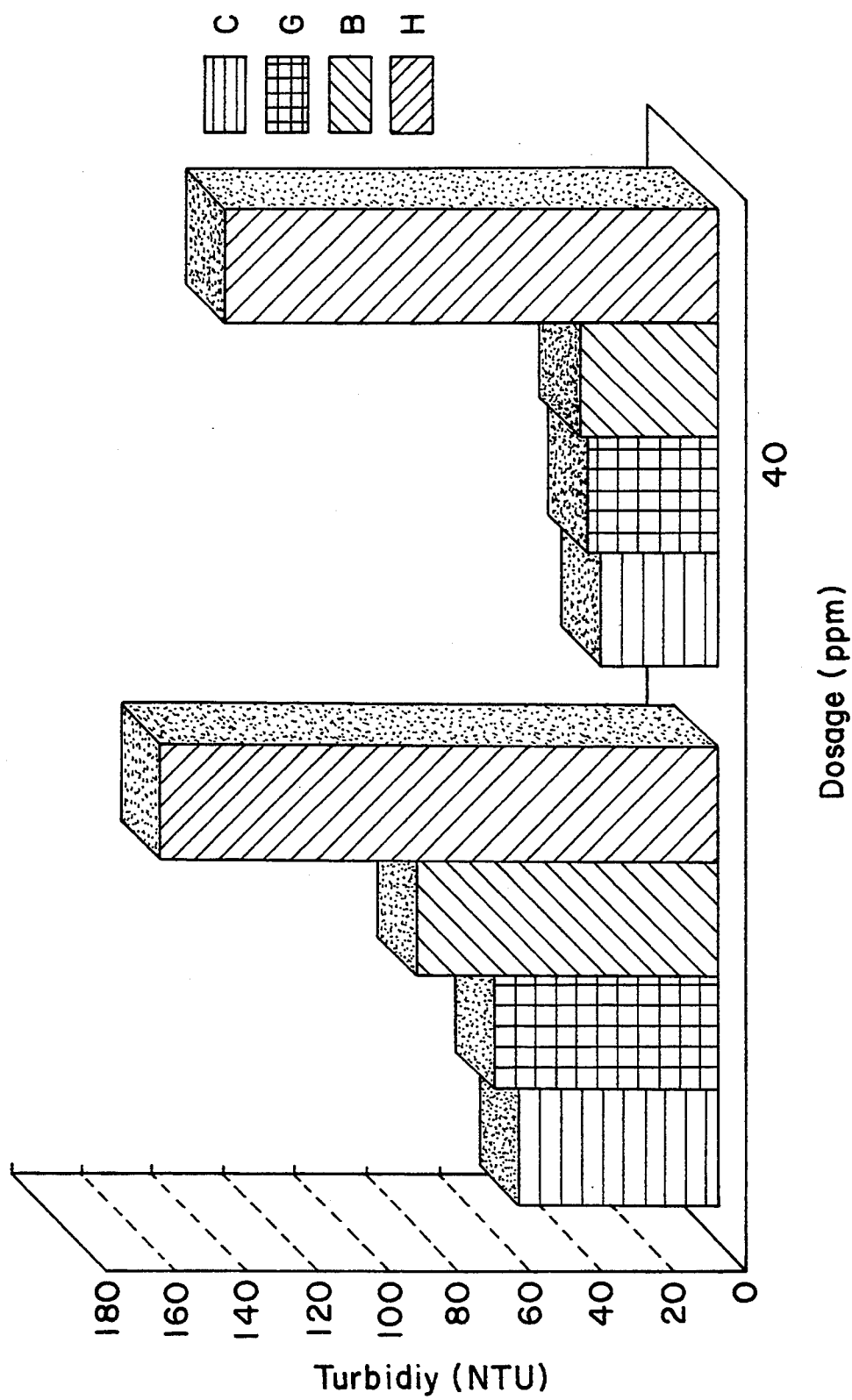
FIG. 3 is a bar graph comparing hydrophobic DADMAC copolymers to a poly(DADMAC) program.

Referring to FIGS. 1, 2 and 3, FIGS. 1, 2 and 3 summarize an evaluation of the hydrophobic polymers of the invention versus commercially available coagulant treatments used in this same application. Table 1 below lists the polymers which were used in the evaluation.

TABLE 1

A=DADMAC/DMAEA•BCQ 50/50 mole ratio
B=DADMAC/DMAEA•BCQ 70/30 mole ratio
C=DADMAC/DMAEA•BCQ 90/10 mole ratio
D=AcAm/DMAEA•MCQ dry polymer (commercial treatment)
E=AcAm/DMAEM•H$_2$SO$_4$
F=AcAm/DMAEA•MCQ latex polymer (commercial treatment)
G=DADMAC/EHA 90/10 mole ratio
H=PolyDADMAC (commercial treatment)

FIGS. 1, 2 and 3 show that the hydrophobic polymers of the invention significantly reduced turbidity when compared to the commercially available coagulant treatments. In fact, the invention improved turbidity from about 50 to about 80%.

Changes can be made in the composition, operation and arrangement of the method of the present invention described herein without departing from the concept and scope of the invention as defined in the following claims:

We claim:

1. A method for conditioning food processing waste water prior to chemical dewatering comprising the step of treating the food processing waste water with an effective amount of at least one hydrophobically modified copolymer coagulant of diallydimethylammonium chloride selected from the group consisting of diallydimethylammonium chloride/dimethylaminoethylacrylate benzyl chloride quaternary, diallydimethylammonium chloride/dimethylaminoethylacrylate cetyl chloride quaternary, diallydimethylammonium chloride/dimethylaminoethylmethacrylate benzyl chloride quaternary, diallydimethylammonium chloride/ethylhexylacrylate and diallydimethylammonium chloride/-dimethylaminoethylmethacrylate cetyl chloride quaternary.

2. The method of claim 1 wherein the food processing waste is treated with from about 1 to about 500 parts per million of the hydrophobic polymer coagulant.

3. The method of claim 1 wherein the food processing waste water is treated with from about 10 to about 300 parts per million of the hydrophobic polymer coagulant.

4. The method of claim 1 wherein the food ]processing waste water is treated with from about 20 to about 100 parts per million of the hydrophobic polymer coagulant.

5. The method of claim 1 wherein the hydrophobically modified polymer coagulant has from 50–99.5 mole percent diallyldimethylammonium chloride.

6. The method of claim 1 wherein the hydrophobically modified polymer coagulant has from 70–95 mole percent diallyldimethylammonium chloride.

7. The method of claim 1 wherein the hydrophobically modified polymer coagulant has from 85–95 mole percent diallyldimethylammonium chloride.

* * * * *